July 27, 1954      P. G. WEILLER      2,685,015
RESISTANCE THERMOMETER ELEMENT
Filed March 31, 1953
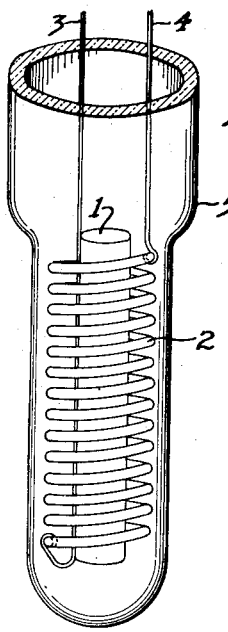
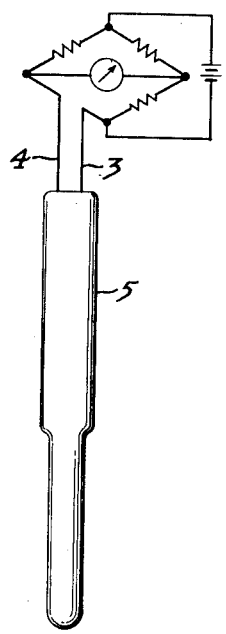
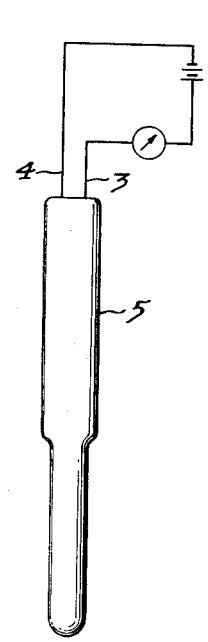
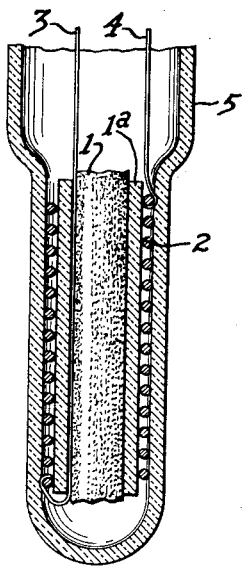
INVENTOR
PAUL G. WEILLER
BY *Harris D. Heineline*
ATTORNEY Patented July 27, 1954

2,685,015

UNITED STATES PATENT OFFICE 2,685,015

RESISTANCE THERMOMETER ELEMENT

Paul G. Weiller, New York, N. Y.

Application March 31, 1953, Serial No. 345,802

6 Claims. (Cl. 201—64)

This invention relates to thermometers, relates particularly to electrical resistance thermometers, and relates especially to a resistance thermometer composed of tungsten or molydenum or titanium wire in high silica glass or fused pure silica suitable for the measurement of temperatures up to within a few degrees of the melting point of the fused silica or high silica glass.

Many attempts have been made to insulate resistance wire in such a way as to maintain a high rate of insulation resistance, and at the same time to maintain a high rate of heat transfer and a good physical strength; most of these attempts involving mica or silica as an insulator and a metal shell for the protecting medium. Such structures, however, necessarily utilize loose pieces of insulating material which make more or less poor contact with the metal shell and are in effect a resistance heater surrounded by an excellent heat insulator through which a minimum rate only of heat transfer is possible.

According to the present invention, it is now found possible to construct an excellent temperature device by the procedure of winding a resistance wire upon an insulating core, inserting the wound core into a vitreous material tube, such as fused silica or high silica glass, prepared from a glass which has a lower coefficient of expansion than either the wire or the core, and then heating the tube, preferably after exhausing the tube to a good vacuum until the heat-softened walls of the tube collapse onto the core and wire winding.

This procedure preferably includes heating the core and wire to nearly the same temperature as the softened glass, and then allowing the whole assembly to cool. The higher coefficient of expansion of the core and wire results in a more rapid shrinkage by them than shrinkage of the glass, and a minimum of annealing or other treatment is necessary, and no subsequent heating brings the overall temperature up to the forming temperature; with the result that no thermal expansion problems arise. In addition, the semi-imbedding of the resistance wire in the glass sheath results in a maximum rate of heat transfer to the glass, and through the glass to surrounding liquid when the device is used as a heater, and when it is used as a thermometer, a maximum rate of transfer of heat through the glass to the partially or completely imbedded resistance wire, resulting in a rapid attainment of heat equilibrium and a rapid response by the indicating meter.

This procedure makes it unnecessary for the glass or fused silica to wet the metal of the resistance wire, and accordingly, the problems of sealing low temperature coefficient glass or silica to a higher coefficient wire disappear, and the exit leads may be sealed through a graded seal located at a point where temperature variations are much less extreme. The resulting thermometer is exceedingly advantageous for use in turbojet airplane engines where the temperatures are extremely high, oxidizing and reducing conditions alternate under conditions of severe chemical reactivity, and accurate temperature measurements are essential.

Thus, the invention consists of an insulating core such as hard, burned porcelain, having a relatively high coefficient of expansion, a resistance wire wound thereon, and a vitreous sheath thereover having a lower coefficient of expansion such that cooling to room temperature avoids the production of strains in the vitreous sheath while facilitating to the utmost, the rapid transfer of heat through the sheath.

This application is a re-filing of my previous applications Serial No. 736,243, filed March 21, 1947, abandoned, and Serial No. 133,180, filed December 15, 1949, allowed September 20, 1951, but forfeited.

Other objects and details of the invention will be apparent from the following description, when read in connection with the accompaning drawings, wherein:

Figure 1 is a view in elevation of a heat responsive device according to the invention;

Figure 2 is a view in cross section of the thermal device;

Figure 3 is a view of the device of the invention with appropriate circuit connections for Wheatstone bridge operation; and Figure 4 is a diagrammatic view of circuit connections for a resistance thermometer according to the invention.

Referring to the drawings, there is provided a core member 1 which may conveniently consist of a glass tube of relatively high temperature coefficient and high softening point, or may consist of a ceramic material such as porcelain, or the like, or it may be a graphite bar having a glass tube 1a thereover for insulation, or other non-conductive material. Upon the core member 1 there is then positioned a winding 2 having terminals 3 and 4, one of which may conveniently be led through the center of the core member, the other of which may lead from the opposite end of the core, parallel to the first lead. The core with its winding and leads is then positioned within a sheath member 5 preferably in the form of a glass tube having a closed end; the sheath being heat collapsed onto the core and winding be evacuating it, while heating it to the softening point.

The core member 1 is required to be a material of relatively high temperature coefficient and relatively high softening point in order that it may hold its shape during the subsequent heating step, and in order that no tensile strains may be imposed upon the outer glass sheath. The preferred construction utilizes a tube of glass for the core having a relatively high temperature coefficient and a relatively high softening point in comparison to the sheath member 5. Since, however, for the higher temperature service, this requirement is not easy to meet, the core member 1 may advantageously consist of a porcelain type ceramic material, the requirements being primarily that it be capable of good resistance to heat shock and good electrical resistance. A preferred type of construction however, utilizes a stiffening core which may be of porcelain or of graphite or other material, even metal, covered with a glass body, preferably a tube which can be of the same type of glass as the outer sheath.

Upon the core, there is then wound the resistance wire 2, as shown in Figs. 1 and 2. The resistance wire 2 preferably consists of either tungsten or molybdenum or titanium or tantalum, because of the very high melting point of these materials and the relatively high specific resistance, as well as the relatively high coefficient of resistance change with temperature change. These materials have a considerably higher temperature coefficient of expansion than do either silica or a high silica glass, but the fact that they need not be wetted by the vitreous sheath avoids any trouble or difficulties from the difference in expansion. The resistance wire 2 then is wound on the core 1 and, if a glass cover 1a is used for the core 1, the resistance wire 2 is wound over the glass tube 1a.

The sheath member 5 may consist of any desired vitreous material which may be cylindrical in shape or may be flattened or otherwise shaped according to the needs of the particular structure being assembled. It may be noted that it is essential that the temperature coefficient of the sheath member 5 be higher than that of the core member 1 and 1a, or at least no lower. If the tube 1a is used alone and no graphite or ceramic center 1 is used, it is essential that the tube 1a have a higher softening point than the sheath 5, or that a very carefully worked-out heating schedule be used so that the heating and shrinkage of the sheath 5 is complete before the tube 1a reaches the softening point.

The sheath member 5 is collapsed onto the core 1 and winding 2 by an appropriate heat treatment. The preferred procedure is to apply a relatively high vacuum to the inside of the sheath 5, leaving present inside pressures from a few millimeters of mercury down to a very few microns. The vacuum serves two essential purposes; first, it removes the air from around the wire and permits of a very close contact between the glass sheath 5 and the wire winding 2, thereby providing for a very high heat transfer through the glass between the wire and the outside environment. Secondarily, the vacuum provides a pressure differential between the inside and the outside of the sheath 5 which causes a rapid and highly efficient shrinking of the glass sheath 5 onto the wire winding 2, which may partially imbed the winding 2, or, if desired, the heating and evacuating step may be caused to yield a practically complete imbedding of the wire 2. This imbedding may be wholly in the sheath 5 or may be partly in the sheath 5 and partly in the inner tube 1a, as desired.

When the sheath is evacuated, a convenient source of heat is applied to the exterior of the sheath 5 and the temperature is brought up to the softening point of the sheath 5, whereupon atmospheric pressure shrinks it down onto the core 1 and winding 2, more or less completely imbedding the wire winding 2 into the glass of the sheath 5.

The imbedding operation does not require a wetting of the wire by the glass, and it does no harm to avoid wetting of the wire, since, in the absence of wetting, no tensile stresses occur between the wire and the glass. When the sheath 5 has been well shrunken onto the core and winding, the flame temperature may be reduced through an appropriate annealing step, or the device may be used without annealing, or may be given the usual lehr anneal, as desired. The open end of the sheath 5 may then be closed in any convenient way such as by filling it with plaster, or by the production of a regular seal between glass and an appropriate low expansion seal wires 3 and 4 to prevent the entrance of moisture or other foreign material.

If the winding 2 is made of an appropriate resistance wire having a relatively high resistance coefficient, the resistance of the winding varies according to the temperature at which it is held, and an excellent resistance thermometer is obtained which may be direct reading if a constant voltage is available, as shown in Fig. 4; or may be read through the agency of a Wheatstone bridge if high accuracy is desired, as shown in Fig. 3.

Thus the device of the invention utilizes a core member having a relatively high coefficient of expansion and a low electrical conductivity with a resistance wire winding thereon and a vitreous tube heat shrunk thereonto by which a rapid, high, response for the resistance thermometer is obtained, or an immersion or other heater having superior heat transfer rates, is obtained.

While there are above disclosed but a limited number of embodiments of the process and product of the invention, it is possible to provide still other embodiments without departing from the inventive concept herein disclosed, and it is therefore desired that only such limitations be imposed upon the appended claims are stated therein or required by the prior art.

The invention claimed is:

1. A heat device comprising a central refractory core having a moderately high coefficient of expansion, a wire winding thereon formed of a metal having a lower coefficient of expansion than said core and a melting point above 1600 degrees C., and a high silica sheath covering both core and wire winding and having a coefficient of expansion still lower, below that of either core or winding, heat shrunk onto said wire winding into close contact but without wetting said wire and without adhering thereto, to give zero tension and compression forces on said wire and a low thermal gradient between said wire and said sheath.

2. A heat device comprising a central refractory ceramic core having a moderately high coefficient of expansion, a wire winding thereon formed from a high melting, above 1600 degrees C. refractory metal having a moderately high resistivity and a coefficient of expansion lower than that of the ceramic core and a high silica sheath covering said core and winding, and having a coefficient of expansion lower than either core or winding, heat shrunk onto said wire and core into close contact but without wetting said wire and without adhering thereto, thereby to obtain zero tension and compressive forces upon heating said wire and a low thermal gradient between said wire and sheath.

3. A heat device comprising a central refractory ceramic core having a moderately high coefficient of thermal expansion, a wire winding thereon formed from a high melting, above 1600 degrees C., refractory metal having a moderately high resistivity and a relatively high coefficient of resistance change with temperature change from the group consisting of tungsten, molybdenum, tantalum and titanium, the ceramic core having a coefficient of expansion higher than any of said metals, and a fused silica sheath covering said core and winding, and having a coefficient of expansion lower than that of both core and wire, heat shrunk onto said winding and core without wetting either and without adhering to either thereof, thereby obtaining substantially zero tension and compressive forces upon heating said wire, and a low thermal gradient between said wire and said sheath.

4. A structure according to claim 3 in which the wire is of titanium, the core is hard burned porcelain.

5. A structure according to claim 3 in which the wire is tungsten.

6. A structure according to claim 3 in which the wire is molybdenum.

References Cited in the file of this patent

UNITED STATES PATENTS

| Number | Name | Date |
|---|---|---|
| 845,413 | Haagn | Feb. 26, 1907 |
| 1,860,541 | Hebler | May 31, 1932 |